United States Patent
Eakin

(10) Patent No.: US 7,987,820 B2
(45) Date of Patent: Aug. 2, 2011

(54) CATTLE FOOT-BATH SYSTEM

(76) Inventor: John W. Eakin, Selah, WA (US)

( * ) Notice: Subject to any disclaimer, the term of this patent is extended or adjusted under 35 U.S.C. 154(b) by 258 days.

(21) Appl. No.: 12/313,601

(22) Filed: Nov. 21, 2008

(65) Prior Publication Data

US 2010/0126428 A1 May 27, 2010

(51) Int. Cl.
*A01K 29/00* (2006.01)
(52) U.S. Cl. ........................................ 119/673
(58) Field of Classification Search ............ 119/673, 119/666, 671; 4/492, 541.4, 541.6, 567, 4/572.1, 586, 625, 622, 671, 672; 601/158, 601/160, 166, 167
See application file for complete search history.

(56) References Cited

U.S. PATENT DOCUMENTS

| | | | |
|---|---|---|---|
| 6,739,286 B2 * | 5/2004 | Vander Veen ................. | 119/673 |
| 7,798,104 B2 * | 9/2010 | Rajkondawar et al. ....... | 119/651 |
| 2008/0196674 A1 * | 8/2008 | Buck et al. .................... | 119/673 |
| 2008/0216762 A1 * | 9/2008 | Gerk et al. .................... | 119/673 |

* cited by examiner

*Primary Examiner* — Rob Swiatek
*Assistant Examiner* — Kristen C Hayes
(74) *Attorney, Agent, or Firm* — Svendsen Legal, LLC

(57) ABSTRACT

A cattle foot-bath system, specifically adapted to mix and charge foot-bath troughs with repeatably precise quantities of chemical treatments. The system administers a concentrated medicinal agent, such as a bactericide, a fungicide, or a viruscide, for the treatment of cattle feet, and includes a day-tank feed valve, which may be a three-way or interlocked valve, for controlling an infeed flow of the concentrated medicinal agent fed into a day tank, which may be mounted to a portable tote-tank containing the concentrated medicinal agent. A day-tank drain valve controls an outlet flow of the concentrated medicinal agent drained from the day-tank, and the day-tank holds a set quantity of the concentrated medicinal agent. A footbath then receives a quantity of dilution water and the set quantity of the concentrated medicinal agent from the day-tank.

6 Claims, 5 Drawing Sheets

CATTLE FOOT-BATH SYSTEM

FIELD OF INVENTION

The present invention generally relates to a cattle foot-bath system, which is specifically adapted to mix and charge foot-bath troughs with precise quantities of chemical treatments.

BACKGROUND

Foot-baths are a valuable tool for the management of cattle, especially in larger scale dairy and feedlot operations. Their use can clean the feet or hooves of the cattle, killing bacteria, viruses and fungi, and generally helping in the heath and hardening of the hooves. When used to deliver the appropriate treatment, the use of foot-baths helps to reduce lameness associated with foot-rot, foot-and-mouth disease, heel erosion and digital dermatitis. For modern dairies, the foot-bath is typically included in the design of cattle housing, generally near the exit from a milking parlor, in a position through which cows normally move, or in an adjacent area through which cows can be diverted when necessary, with minimal disturbance to their normal routine. Ideally, two foot-baths should be used in tandem, the first containing water to clean the feet, and the second containing the suitable treatment chemical.

Conventional foot-bath systems are maintained and operated by on-site workers and personnel, who simply fill an empty foot-bath with a concentrate to a predetermined level, and then top off the foot-bath with water. This conventional technique sometimes results in foot-bath solutions that are too weak for effective treatment, or are too strong and may injure the feet of the cattle. A known improvement to this conventional, manual method includes the automated, metered control of the concentrate into the foot-bath. Such automatically metered systems have the potential to reduce the accurate delivery problems often encountered with the manual method. However, these automated system either require some sort of remote monitoring or feedback to a controller, or requires a user to program the controller to precisely follow the processing of cattle.

An economical and foolproof method for the operation of a cattle foot-bath is needed that provides the foot-bath with an accurately measured hoof treatment solution as needed for the particular cattle handling operation, without programming an expensive and difficult to maintain controller or some other automated, fallible feed-system apparatus. A detailed understanding of the present invention's features will be had upon reference to the following description, when read in conjunction with the accompanying drawings.

DESCRIPTION OF PREFERRED EMBODIMENTS

Figure 1:
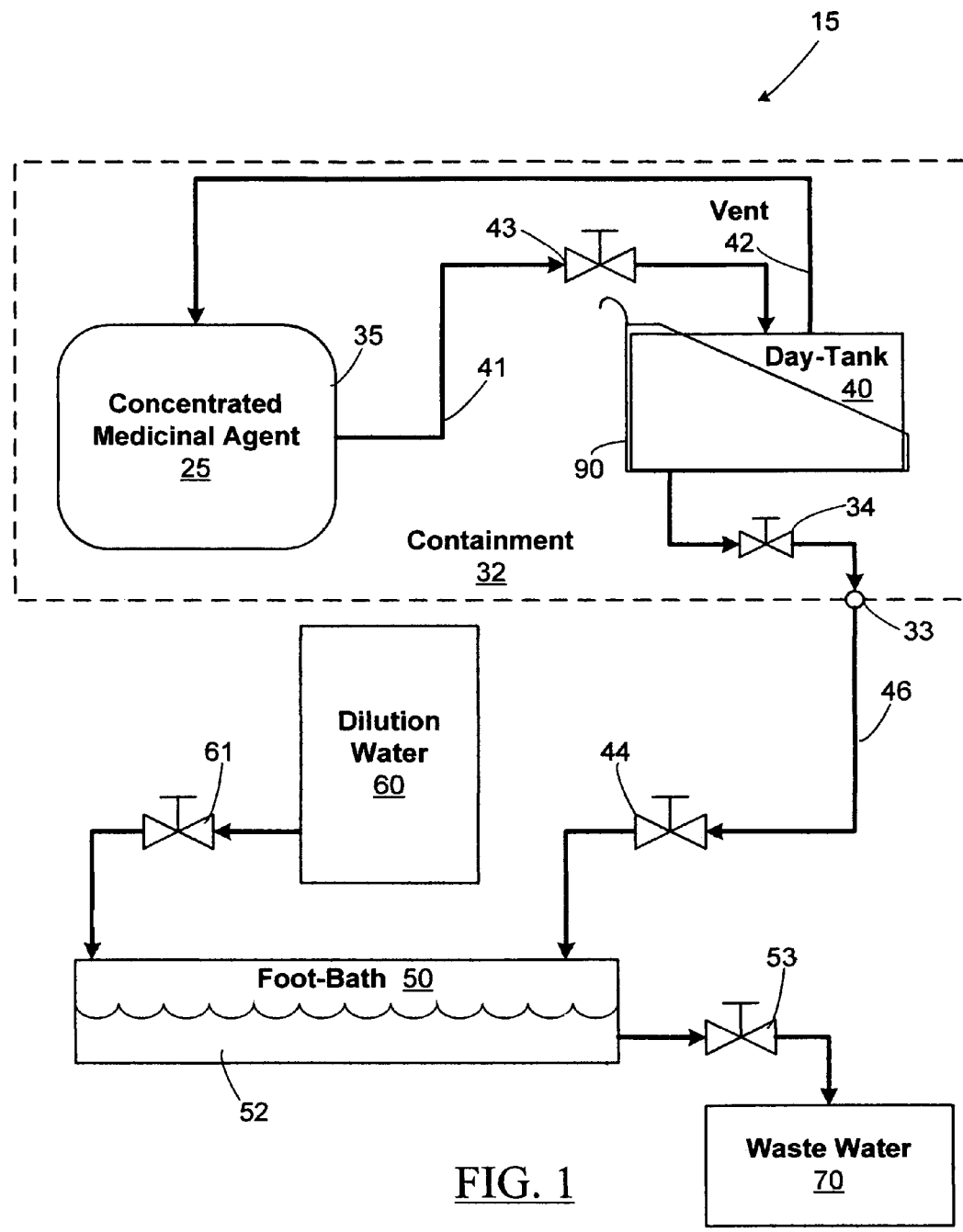
FIG. 1 is a schematic view of a cattle foot-bath system, according to a preferred embodiment of the present invention.

Preferred embodiments of the present invention are shown in FIGS. 1 through 3B, directed to a cattle foot-bath system 15. The cattle foot-bath system is well suited for the treatment and cleaning of feet or hooves of the cattle. As shown in FIG. 1, the cattle foot-bath system 15 includes the semi-automated delivery of a concentrated medicinal agent 25, the medicinal agent selected for the treatment of cattle feet.

The concentrated medicinal agent 25 may be any medically active bactericide, fungicide, or viruscide, desired for use in a foot bath 50 with the cattle foot-bath system 15 of the present invention. Preferably, the concentrated medicinal agent 25 is a concentrated "formalin" solution, which is formaldehyde in a water solution. Formalin is especially useful in the preventive treatment of lameness associated with foot rot, and related diseases caused by bacterial infections of the hooves. The formalin concentrate is most preferably contained in a portable tank, conventionally referred to as a "tote-tank" 35. Because the tote-tank contains a concentrated solution of what may be an environmentally sensitive substance, the tote-tank is preferably placed within a containment 32, as shown in FIGS. 1 through 3B. The containment prevents contamination of the environment external to the containment, if the tote-tank leaks.

The concentrated medicinal agent 25 is preferably fed through the containment 32 at a containment penetration 33, as shown in FIGS. 1 through 3B. Most preferably, the feed is also controlled with a feed shut-off valve 34, which acts as a safety valve to prevent leakage downstream of the containment.

As shown in FIGS. 1 through 3B, the concentrated medicinal agent 25 is fed into a day-tank 40. The day-tank holds the set quantity of the concentrated medicinal agent, providing an exact and consistent quantity for use with the foot-bath 50. The day-tank is sized to receive and precisely measure a quantity of the concentrated medicinal agent. Preferably, the day-tank contains five U.S. gallons, when filled, but could hold more or less material, depending on the activity and strength of the concentrated medicinal agent, the final volume of the foot-bath, and ultimate desired concentration of the resultant mixture within the foot-bath.

For the most preferred concentrated medicinal agent 25, a standard formalin concentrate, of 37% formaldehyde in water by volume is employed. After filling, the day-tank feed valve 43 is closed, and the day-tank 40 is ready for delivery to the foot-bath 50. The filled day-tank quantity of concentrate is mixed in the foot-bath 50 with a set quantity of a dilution water 60. Preferably, for the five-gallon day-tank, with the 37% solution, forty-five U.S. gallons of the dilution water are employed. This results in a volume of fifty U.S. gallons of a working mixture 52 within the foot-bath having a concentration of 3.7% formaldehyde in water by volume, or one-tenth of the original concentration. The dilution water may be any source of pure or recycled water for use by the cattle.

Figure 3A:
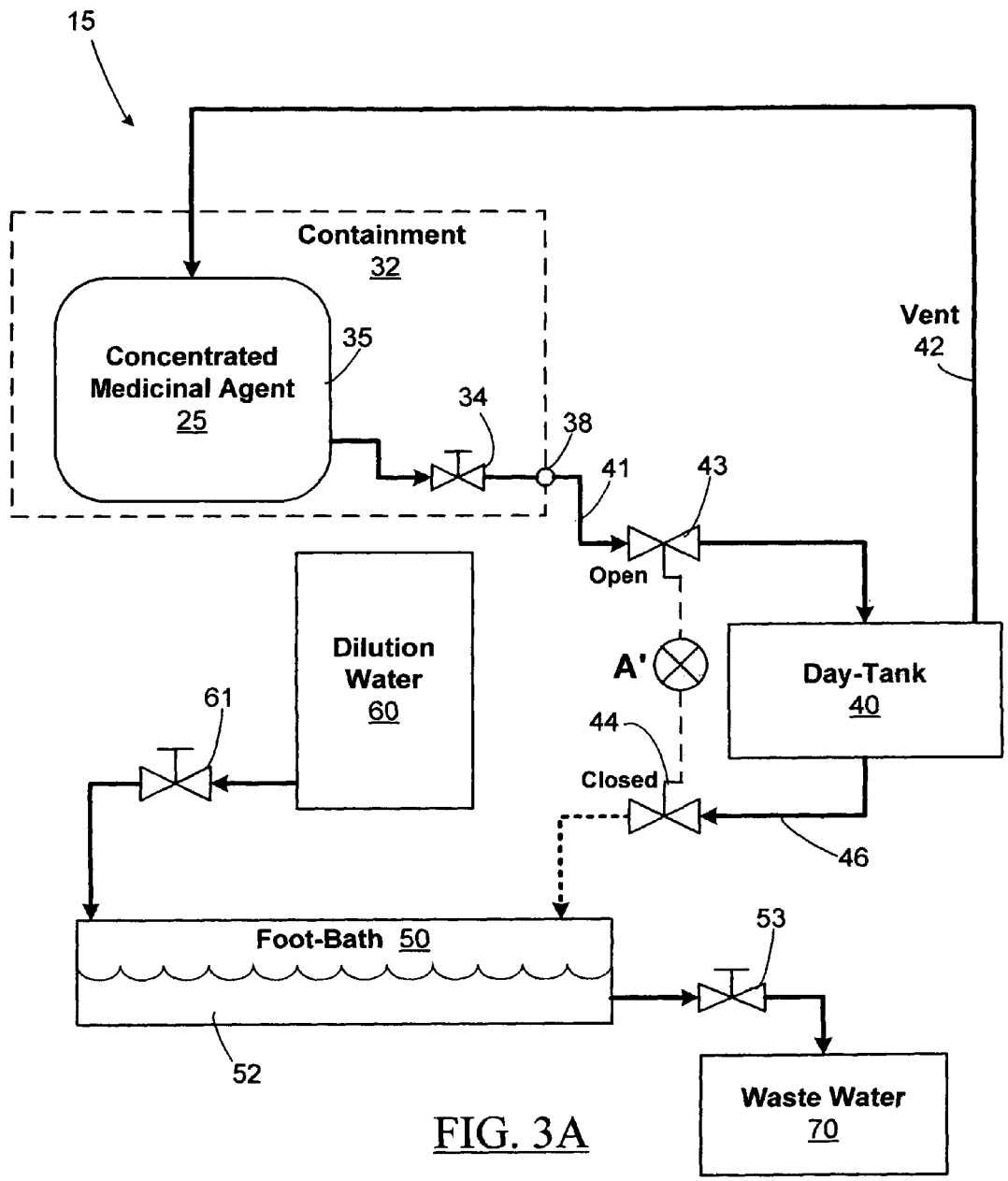
FIG. 3A is a schematic view of a cattle foot-bath system, according to a preferred embodiment of the present invention.
Figure 3B:
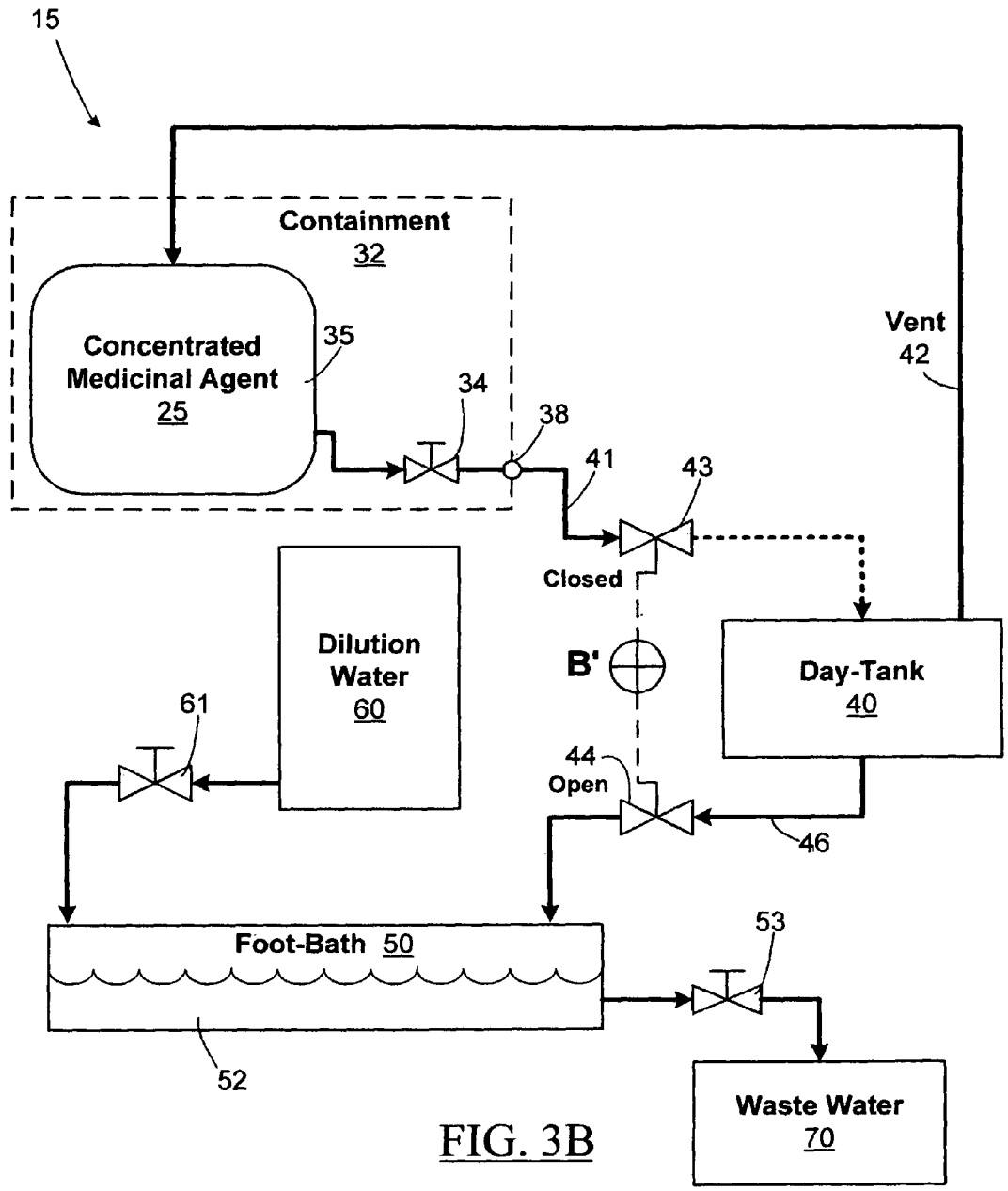
FIG. 3B is a schematic view of a cattle foot-bath system, according to a preferred embodiment of the present invention.

Specifically, as shown in FIGS. 1, 3A and 3B, a day-tank feed valve 43 is employed to control an infeed flow of the concentrated medicinal agent 25 into the day tank 40, through a concentrated feed-pipe 41. After the day-tank is filled, the day-tank feed valve is closed and a day-tank drain valve 44 is opened. The day-tank drain valve controls an outlet flow of the concentrated medicinal agent drained from the day-tank, through a day-tank drain pipe 46.

As shown in FIGS. 1 through 3B, the cattle foot-bath system 15 preferably includes a vent 42 connecting the day-tank 40 to the concentrated medicinal agent 25 this component recycles any vapors emitted from the day-tank, especially during filling, and if the day-tank is overfilled, the overflow is directed back to the tote-tank of concentrated medicinal agent.

Preferably, prior to the opening of the day-tank drain valve 44, to fill the foot-bath 50, the foot-bath is partially filled with the dilution water 60, by the opening of a dilution water valve 61. This may be additionally accomplished with either a metered valve, tank graduations on the container or tank holding the dilution water, or a mark on the foot-bath. Alternatively, the contents of the day-tank can be released into the foot-bath by opening the day-tank drain valve and the dilution water then added to "top-off" the foot-bath at a set fill point. With the pre-measured contents of the day-tank and the added dilution water, the foot-bath contains the working mixture 52, which includes the concentrated of the medicinal agent diluted to desired, effective level. This process for the cattle foot-bath system 15 is repeatable with the same exact results, without requiring exacting volumetric measurements or oversight by technically skilled personnel.

Preferably, the foot bath 50 is conventionally sized with capacity of fifty U.S. gallons. Typically, the foot-bath has a length of approximately six feet in and is approximately three feet in width. The working mixture 52 should fill the foot-bath to a depth of approximately four to six inches. The foot-bath can be located at the exit lanes from a milking parlor, when employed for use in a dairy operation.

Typically, the foot-bath 50 is drained and recharged with fresh working mixture 52 on a daily basis. To drain the previously mixed, used or spent working mixture 52 from the foot-bath, a foot-bath drain valve 53 is employed, as located in FIGS. 1 through 3B. The working mixture is transferred as a waste water 70, which may be any appropriate tank, lagoon or pond. The formalin active ingredient of the preferred concentrated medicinal agent 25 is converted into a benign byproduct quickly, attributable to degradation from heat, sunlight and cattle urine. The waste water may be reclaimed for other uses in the farm, ranch or dairy employing the cattle foot-bath system 15.

Figure 2A:
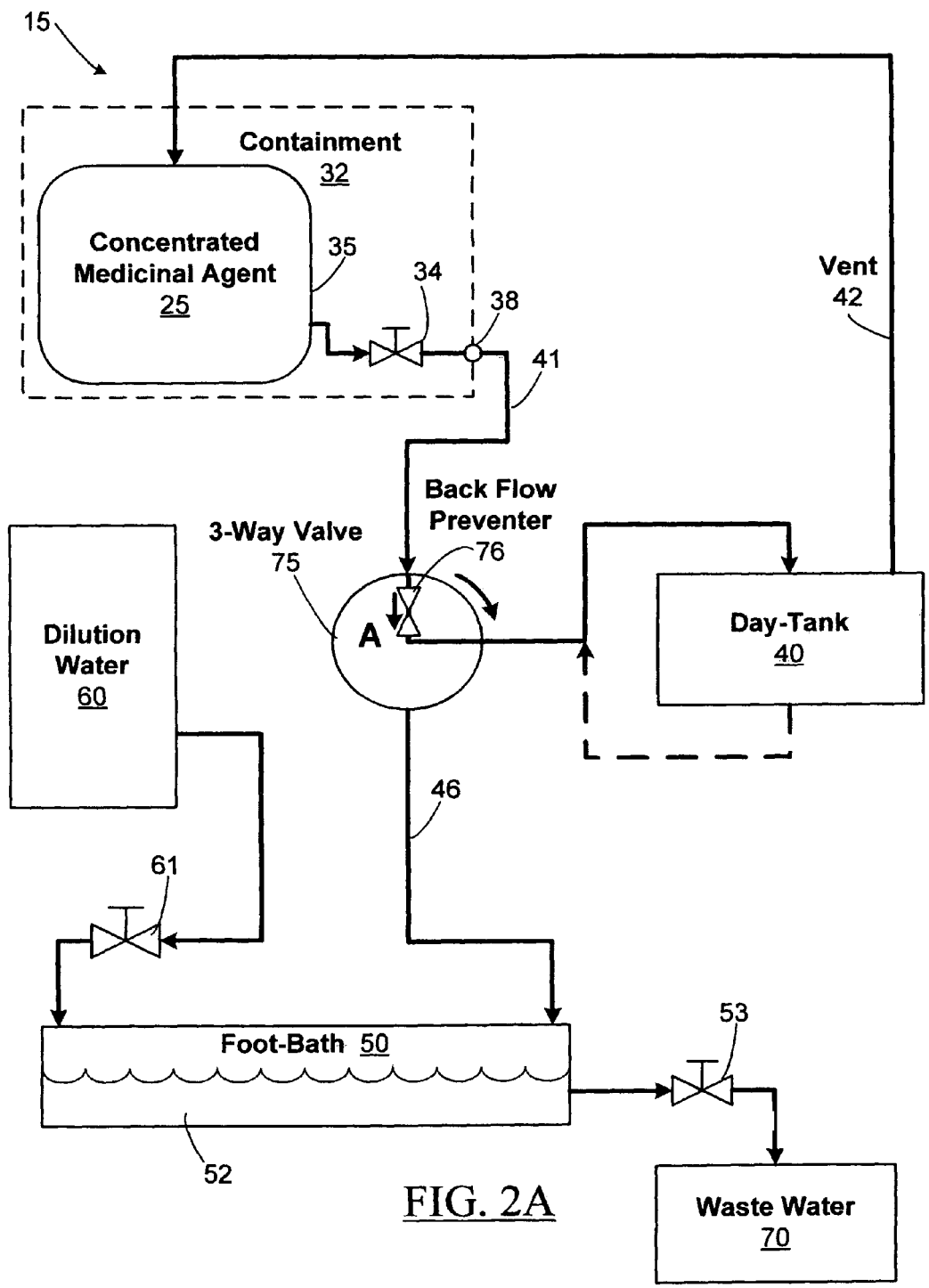
FIG. 2A is a schematic view of a cattle foot-bath system, according to a preferred embodiment of the present invention.
Figure 2B:
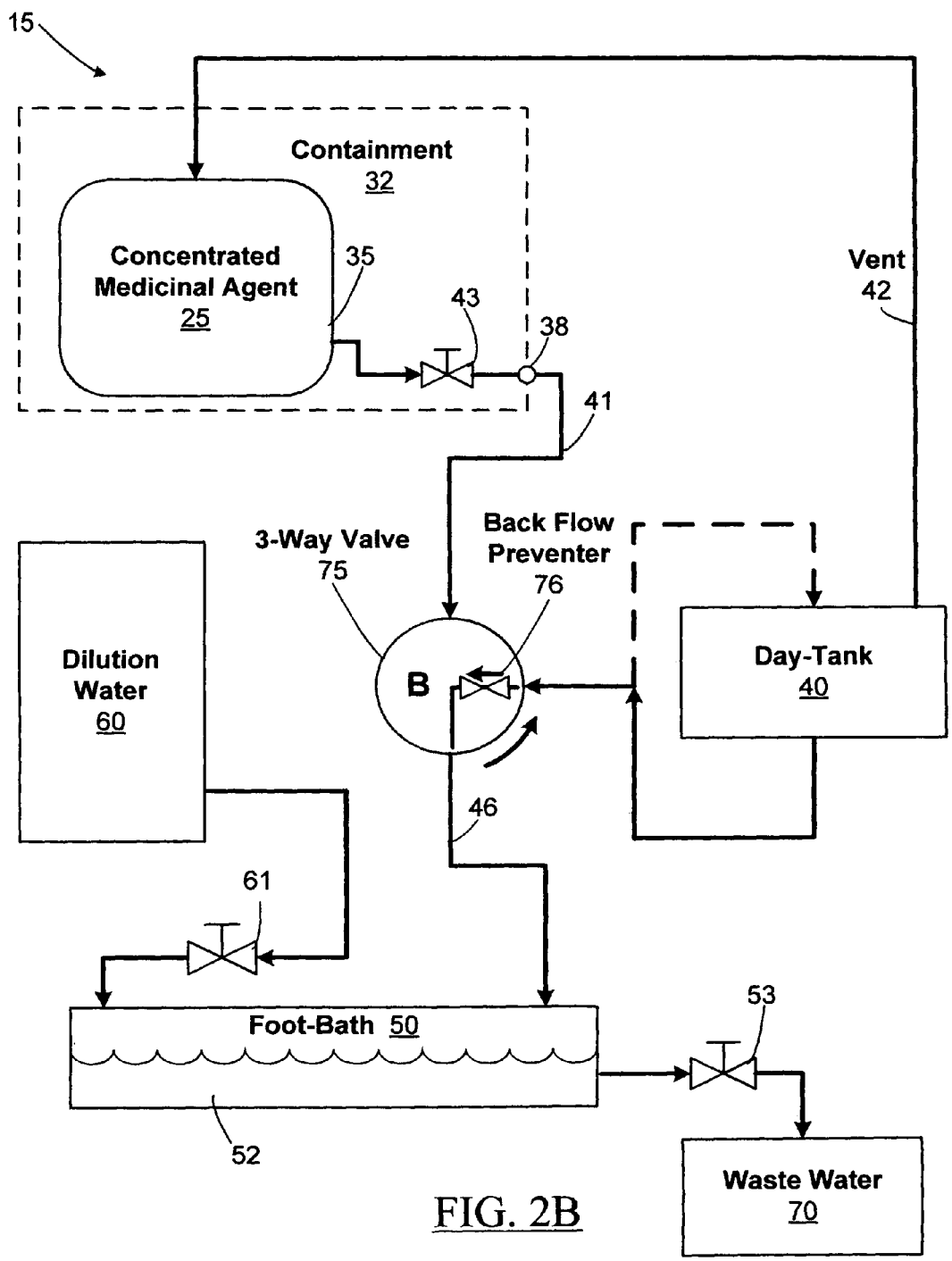
FIG. 2B is a schematic view of a cattle foot-bath system, according to a preferred embodiment of the present invention.

An alternative embodiment of the cattle foot-bath system 15 is shown in FIGS. 2A and 2B, employing a three-way valve 75. The three-way valve is preferably a conventional, three-way diverter type of valve, with an inlet and a valve with the ability to select one of two outlets. The three-way valve replaces the function of the day-tank feed valve 43 and the day-tank drain valve 44. The three-way valve also assures that the day-tank 40 is used as a measuring tank, and not drained as it fills, or simply employed as a flow-through passage from the tote-tank to the foot-bath 50. FIG. 2A shows the three-way valve in a day-tank fill position A, which serves to fill the day-tank, while preventing the day-tank from draining into the foot-bath. FIG. 2B shows the three-way valve in a day-tank drain position B, which serves to drain the day-tank, while preventing the day-tank from filling with the concentrated medicinal agent 25.

Additionally, the three-way valve 75 may include a backflow preventer 76. The back-flow preventer is a standard flow control device that halts the reverse flow of liquid through the valve. In position A, as shown in FIG. 2A, the back-flow preventer stops the flow of concentrated medicinal agent 25, back to the tote-tank 35 from the day-tank 40. In position B, as shown in FIG. 2B, the back-flow preventer stops the flow of concentrated medicinal agent 25, back to the day-tank 40 from the foot-bath 50.

In an additional alternative embodiment of the cattle foot-bath system 15, a valve interlock 80 may be included, to further improve the reliability of operation for the cattle foot-bath system 15. As with the three-way valve 75, the valve interlock assures that the day-tank 40 is used as a measuring tank, and not drained as it fills, or simply employed as a flow-through passage to the foot-bath 50. FIG. 3A shows the valve interlock in a day-tank fill position A', which serves to open the day-tank feed valve 43, while closing the day-tank drain valve 44. FIG. 3B shows the valve interlock in a day-tank drain position B', which serves to drain the day-tank, while preventing the day-tank from filling with the concentrated medicinal agent 25.

The valve interlock 80 may be a mechanical or electrical device that prevents flow through the day-tank drain valve 44, while the day-tank feed valve 43 is in the open position, and conversely prevents flow through the day-tank feed valve, while the day-tank drain valve is in the open position. An interlock bar can be employed to serve as the valve interlock, or a solenoid powered electro-mechanical interlock can be utilized, for example.

For convenience in operation of the cattle foot-bath system 15, the day-tank 40 may be mounted directly to the tote tank of the concentrated medicinal agent 25, with a day-tank tray 90, as shown in FIG. 1. With the day tank tray attachment to the tote tank, the day tank can be placed within the containment 42, or straddle the containment as preferred. If the day-tank is placed within the containment, the containment penetration 33 is placed on the outflow from the day-tank, in the day-tank drain line to the foot bath 50.

Having now described the present invention, to those skilled in the art to which it pertains, it may become apparent that the need to make modifications without deviating from the intention of the invention. In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A cattle foot-bath system comprising:
   a concentrated medicinal agent for the treatment of cattle feet;
   a day-tank feed valve for controlling an infeed flow of the concentrated medicinal agent through a concentrated feed pipe, into a day-tank;
   a day-tank drain valve for controlling an outlet flow of the concentrated medicinal agent drained from the day-tank;
   the day-tank for holding a set quantity of the concentrated medicinal agent;
   a footbath for receiving a quantity of dilution water and the set quantity of the concentrated medicinal agent drained from the day-tank;
   the quantity of dilution water and the set quantity of the concentrated medicinal agent from the day-tank mix in the footbath to form a repeatably precise concentration of a diluted medicinal agent
   a day-tank tray mounted to a portable tank, the portable tank containing the concentrated medicinal agent; and
   the day-tank received into the day-tank tray.

2. The cattle foot-bath system of claim 1, wherein:
   the concentrated feed pipe connects to a tank for containing the concentrated medicinal agent, and a containment surrounds the tank of concentrated medicinal agent; and
   the concentrated feed pipe passes through the containment proximate to a safety valve.

3. The cattle foot-bath system of claim 1, additionally including:

a valve interlock for preventing both the day-tank feed valve and the day-tank drain valve from both being open at the same time.

4. The cattle foot-bath system of claim 1, additionally including:
a three way valve for selectively routing flow of the concentrated medicinal agent into the day-tank from the concentrated feed pipe, or routing flow of the concentrated medicinal agent out of the day-tank through a day-tank drain pipe to the foot-bath.

5. The cattle foot-bath system of claim 1, wherein:
the concentrated medicinal agent consists of: a bactericide, a fungicide, or a viruscide.

6. The cattle foot-bath system of claim 1, wherein:
a containment surrounds the tank of concentrated medicinal agent and the day tank received into the day-tank tray;
a day-tank drain pipe connects to the day tank for draining the day-tank;
the day-tank drain pipe passes through the containment proximate to a safety valve; and the day-tank received into the day-tank tray; and
the day-tank drain pipe passes through the containment proximate to a safety valve.

\* \* \* \* \*